(12) United States Patent
Bauer

(10) Patent No.: US 7,035,033 B2
(45) Date of Patent: Apr. 25, 2006

(54) METHOD AND APPARATUS FOR REINITIALIZING A TAPE DRIVE AFTER A POWER LOSS

(75) Inventor: Russell Allen Bauer, Austin, TX (US)

(73) Assignee: Certance LLC, Costa Mesa, CA (US)

( * ) Notice: Subject to any disclaimer, the term of this patent is extended or adjusted under 35 U.S.C. 154(b) by 26 days.

(21) Appl. No.: 10/928,837

(22) Filed: Aug. 26, 2004

(65) Prior Publication Data

US 2005/0141121 A1    Jun. 30, 2005

Related U.S. Application Data

(63) Continuation of application No. 09/907,676, filed on Jul. 19, 2001, now Pat. No. 6,804,077.

(60) Provisional application No. 60/220,659, filed on Jul. 25, 2000.

(51) Int. Cl.
*G11B 15/18* (2006.01)

(52) U.S. Cl. .......................... 360/69; 360/71; 360/95; 242/332.4

(58) Field of Classification Search .................. None
See application file for complete search history.

(56) References Cited

U.S. PATENT DOCUMENTS

| | | | |
|---|---|---|---|
| 4,043,054 A | 8/1977 | Crowder | 35/9 A |
| 5,388,016 A | 2/1995 | Kanai et al. | 360/72.1 |
| 5,440,716 A | 8/1995 | Schultz et al. | 395/444 |
| 5,557,484 A | 9/1996 | Leonhardt et al. | 360/95 |
| 6,034,839 A | 3/2000 | Hamming | 360/95 |
| 6,438,652 B1 | 8/2002 | Jordan et al. | 711/120 |
| 6,442,725 B1 | 8/2002 | Schipke et al. | 714/741 |
| 6,571,304 B1 | 5/2003 | Basham et al. | 710/53 |
| 6,603,624 B1 | 8/2003 | Takayama | 360/69 |
| 6,674,599 B1 | 1/2004 | Rae et al. | 360/72.1 |
| 2002/0156983 A1 | 10/2002 | Jones et al. | 711/143 |

*Primary Examiner*—Andrew L. Sniezek
(74) *Attorney, Agent, or Firm*—Thelen Reid & Priest LLP

(57) ABSTRACT

A method and apparatus to quickly and correctly re-initialize a tape drive mechanism after power loss employs a non-volatile memory to store functional state data during normal operation of the tape drive mechanism. After a power loss, the functional state data is read from the non-volatile memory so that the tape drive mechanism can be properly re-initialized based on the recovered functional state data.

8 Claims, 5 Drawing Sheets

METHOD AND APPARATUS FOR REINITIALIZING A TAPE DRIVE AFTER A POWER LOSS

CROSS-REFERENCE TO RELATED APPLICATION

This application claims priority based on parent application Ser. No. 09/907,676 now U.S. Pat. No. 6,804,077 entitled, "Method And Apparatus For Reinitialzing A Tape Drive After A Power Loss" by Russell Allen Bauer filed Jul. 19, 2001 which claims priority based on provisional application Ser. No. 60/220,659 entitled, "Method Of Recovering Mechanical Position After Power-Loss" by Russell Allen Bauer filed Jul. 25, 2000.

FIELD OF THE INVENTION

The present invention relates to a method and apparatus for quickly and consistently reinitializing a tape drive after a loss of power to the tape drive.

DESCRIPTION OF RELATED ART

Single reel tape cartridges are used to transport and store tape for reel-to-reel tape drives. A single reel tape cartridge is inserted into a tape drive and a mechanism is used to load the end of the tape into a take-up reel from the tape cartridge. Once the end of the tape is loaded into the take-up reel, the tape drive operates as a reel-to-reel tape drive. A motor is coupled to the take-up reel to rotate the take-up reel about the take-up reel axis and another motor is coupled to the single reel tape cartridge to rotate the reel of the tape cartridge about its axis.

The tape drive mechanism attaches to a tape leader pin, located at the end of the tape contained in the single reel tape cartridge. The hub filler uses a slot in the hub filler for receiving the tape leader pin. The hub filler is coupled to a guide arm that drives the hub filler between the single reel tape cartridge and the take-up reel. An example of a mechanism for driving the hub filler between the tape cartridge and the take-up reel is disclosed in U.S. Pat. No. 6,034,839.

FIG. 1 is a view of the tape drive mechanism disclosed in U.S. Pat. No. 6,034,839. The hub filler 300 enters into the cartridge 210 and attaches to the end of the tape. The hub filler 300 then moves along a guide rail 247, driven by the guide arm 250. Typically, the hub filler 300 attaches to the end of a tape in the tape cartridge 210 and the guide arm 250 moves the hub filler 300 along the guide rail 247, trailing the tape across the read/write head 222 and into the take-up reel 242. The hub filler 300 enters the take-up reel 242 through a channel 244 and into the hub 245 of the take-up reel 242.

FIG. 2 is a top view of the tape drive mechanism, depicting the hub filler 300 in the take-up reel 242 with the tape 216 attached. The single reel tape cartridge 210 is positioned in the tape drive. The tape 216 is wound on a reel inside the cartridge 210. The end of the tape 216 is attached to a leader pin 214. The hub filler 300 has transported the end of the tape 216 along the guide rail 247, driven by the guide arm 250, from the cartridge 210 to the take-up reel 242. During this transportation hub filler 300 pivots on axle 252 and is held to the guide rail 247 by pressure from a spring. The hub filler 300 also includes a catcher that attaches to the leader pin 214 when entering the cartridge 210. The tape 216 is passed across the read/write head 222 and the end of the tape 216 is secured to the take-up reel 242. The tape drive is then operated by rotation of the take-up reel 242 and the single reel of the cartridge 210 about their respective axes to move the tape 216 across the read/write head 222. Motors are used to rotate the take-up reel 242 and the single reel of the cartridge 210, controlling the speed of the tape 216 as it moves across the read/write head 222. The hub filler 300 pivots on an axle 252 that is coupled to the guide arm 250. This pivoting is necessary for the hub filler 300 to be guided on the guide rail 247 into the take-up reel 242. Once the hub filler 300 is in the take-up reel 242, with the tape 216 attached, the take-up reel 242 rotates to thereby unload the tape from the cartridge 210. The hub filler 300 rotates with the take-up reel 242 on the axle 252.

There are some concerns regarding the conventional tape drive described above. During the sequence of operations of a conventional tape drive mechanism there is a possibility of a power loss. When power is eventually restored to the tape drive, it is difficult for a controller that controls the mechanical operation of the conventional tape drive to determine what operation in the sequence of operations the conventional tape drive was performing at the time of power loss. In other words, the controller does not know, after the restoration of power, how to continue operation of the tape drive. When the conventional tape drive inevitably continues operation after restoration of power, there is a likelihood that the leader pin 214 will become disengaged from the hub filler 300. This problem may exist when, at the time of power loss, the hub filler 300 was in between the tape cartridge 210 and take-up reel 242. Such a circumstance will effectuate a "jam" in a tape drive and cause the tape drive to be temporarily inoperable. This circumstance is very inconvenient for the user of the "jammed" tape drive and may cause significant delays for the user.

Some conventional tape drives include sensors that sense the position of the mechanical parts of the tape drive mechanism after recovery of power. However, these sensing arrangements can be somewhat inaccurate and this inaccuracy can cause the tape drive mechanism to be "jammed", as discussed above. Further, this sensing of the position of the mechanical parts after a power recovery often does not provide enough information to determine the direction the mechanical parts were moving when the power loss occurred. In other words, the conventional tape drive mechanism cannot consistently resume operation during reinitialization from where the tape drive mechanism was operating prior to power loss. This may cause an undesirable delay during reinitialization. Further, the hardware necessary for sensing the position of mechanical parts of the conventional tape drive takes up valuable space in the tape drive, which is undesirable in compact tape drives.

SUMMARY OF THE INVENTION

There is a need for a tape drive that can consistently resume operation during reinitialization after a power loss, with minimum time delay. There is also a need for a tape drive mechanism that can consistently resume operation during reinitialization after a power loss, but consumes minimal space.

These and other needs are met by embodiments of the present invention, which provide a method and apparatus of utilizing a non-volatile memory that stores the functional state of a tape drive throughout the operation thereof. Particularly, in embodiments of the present invention, the tape drive mechanism is arranged to store in the non-violatile memory the last instruction issued from a controller to the tape drive mechanism. This last issued instruction is further stored in relation to the sequence of instructions that the tape drive mechanism is performing at time of storage. Accordingly, if a power loss occurs during the operation of the tape drive mechanism according to an issued instruction, the tape drive is arranged to read the functional state of the tape drive mechanism from the non-volatile memory during reinitialization.

The present invention has the advantage of fast reinitializing after power loss. This is possible, since the last issued instruction in relation to the sequence of instructions that the tape drive mechanism was performing at the time of power loss is stored in the non-volatile memory. Accordingly, after a power loss, the tape drive mechanism can resume operation without significant delay during reinitialization. Hence, it is unnecessary for the tape drive to sense or attempt to determine where in the sequence of instructions the tape drive was at the time of power loss, based on the position of the mechanical parts of the tape drive mechanism.

Another advantage of the present invention over a conventional tape drive is that mechanical failure or "jamming" is less likely to occur. In embodiments of the present invention, the tape drive can resume operation at the same instruction in the sequence of instructions during reinitialization with a significant reduction, in comparison to a conventional tape drive, in the probability of mechanical failure or "jamming". For instance, in a conventional tape drive, if a hub filler is transporting an end of tape with a leader pin attached, it is possible for the leader pin to detach from the hub filler during reinitialization. This causes the tape to be "jammed" in the tape drive. This can occur for a variety of reasons. One reason is that during reinitialization of a conventional tape drive, it is necessary to perform several mechanical operations to sense the position of the hub filler. Accordingly, during these mechanical operations, the leader pin can be inadvertently detached from the hub filler. Another reason is that during reinitialization, it may not be possible through the use of sensors to determine where in the sequence of instruction the conventional tape drive mechanism was operating during the power loss. More particularly, the conventional tape drive mechanism may not be able to determine whether the tape was being loaded or unloaded at time of power loss. Accordingly, the tape drive of the present invention alleviates this disadvantage by storing the functional state in relation to the sequence of instruction the tape drive mechanism was performing at time of power loss, so that during reinitialization the tape drive mechanism can efficiently and consistently resume operation.

The foregoing and other features, aspects, and advantages of the present invention will become more apparent from the following detailed description of the present invention, taken in conjunction with the accompanying drawings.

DETAILED DESCRIPTION OF THE INVENTION

The present invention relates to a method and apparatus, utilizing a non-volatile memory for storing the functional state of a tape drive mechanism. The tape drive mechanism is arranged to load and unload tape from a single reel tape cartridge. These loading and unloading operations require a sequence of instructions from a controller of a tape drive. After each issuance of an instruction in a sequence of instructions from the controller, the functional state or the last instruction issued from the controller is stored in the non-volatile memory. Accordingly, during reinitialization of the tape drive mechanism after a power loss, the functional state is read from the non-volatile memory and utilized to efficiently and consistently continue the sequence of instructions the tape drive mechanism was performing at the time of power loss. This reading of the functional state during reinitialization can prevent the detachment of a hub filler from a leader pin, for example. Further, this reading of the functional state during reinitialization prevents the repeating of an operation the tape drive had already performed prior to the power loss.

Figure 1:
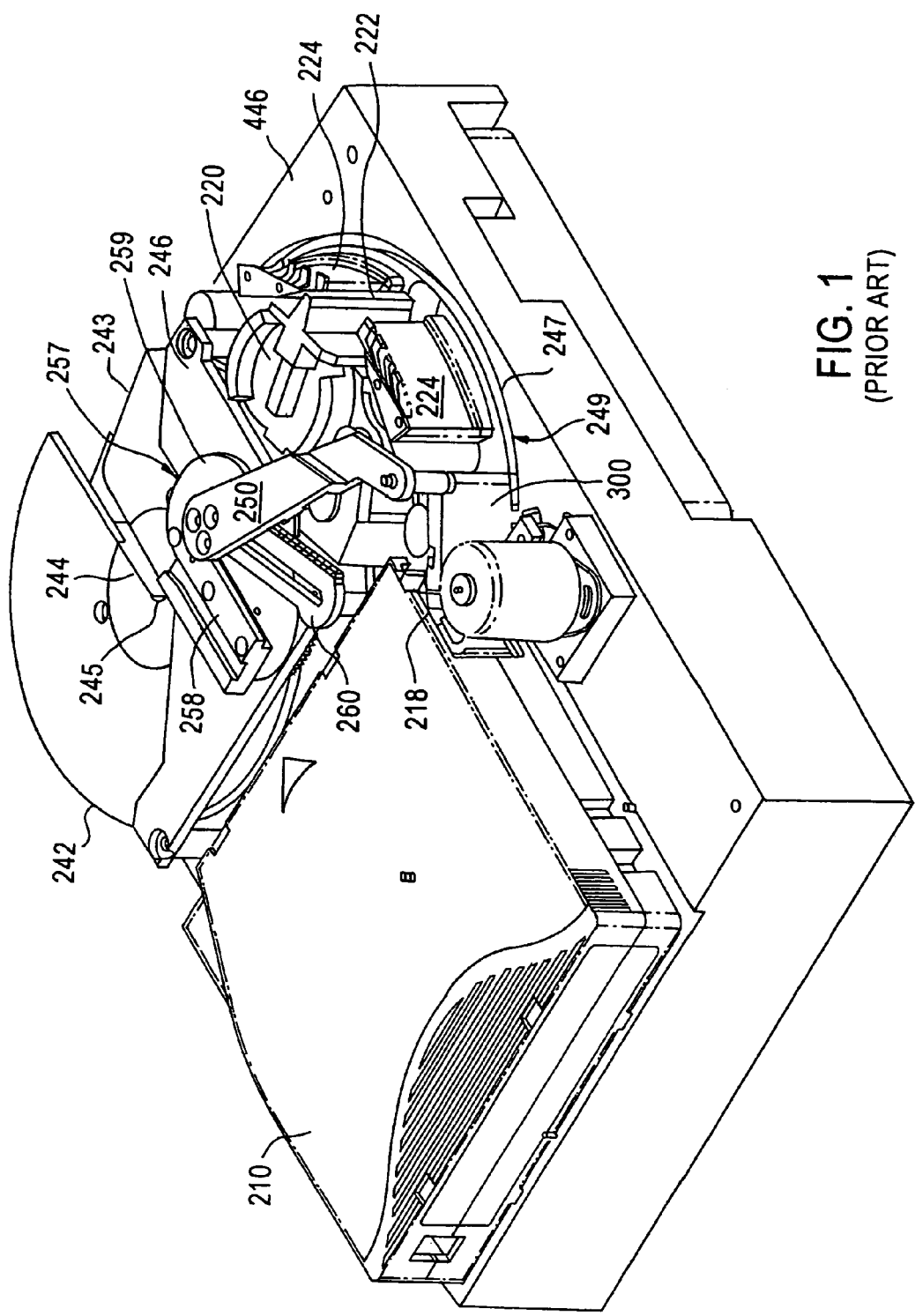
FIG. 1 is a view of a prior art tape drive loading mechanism.
Figure 2:
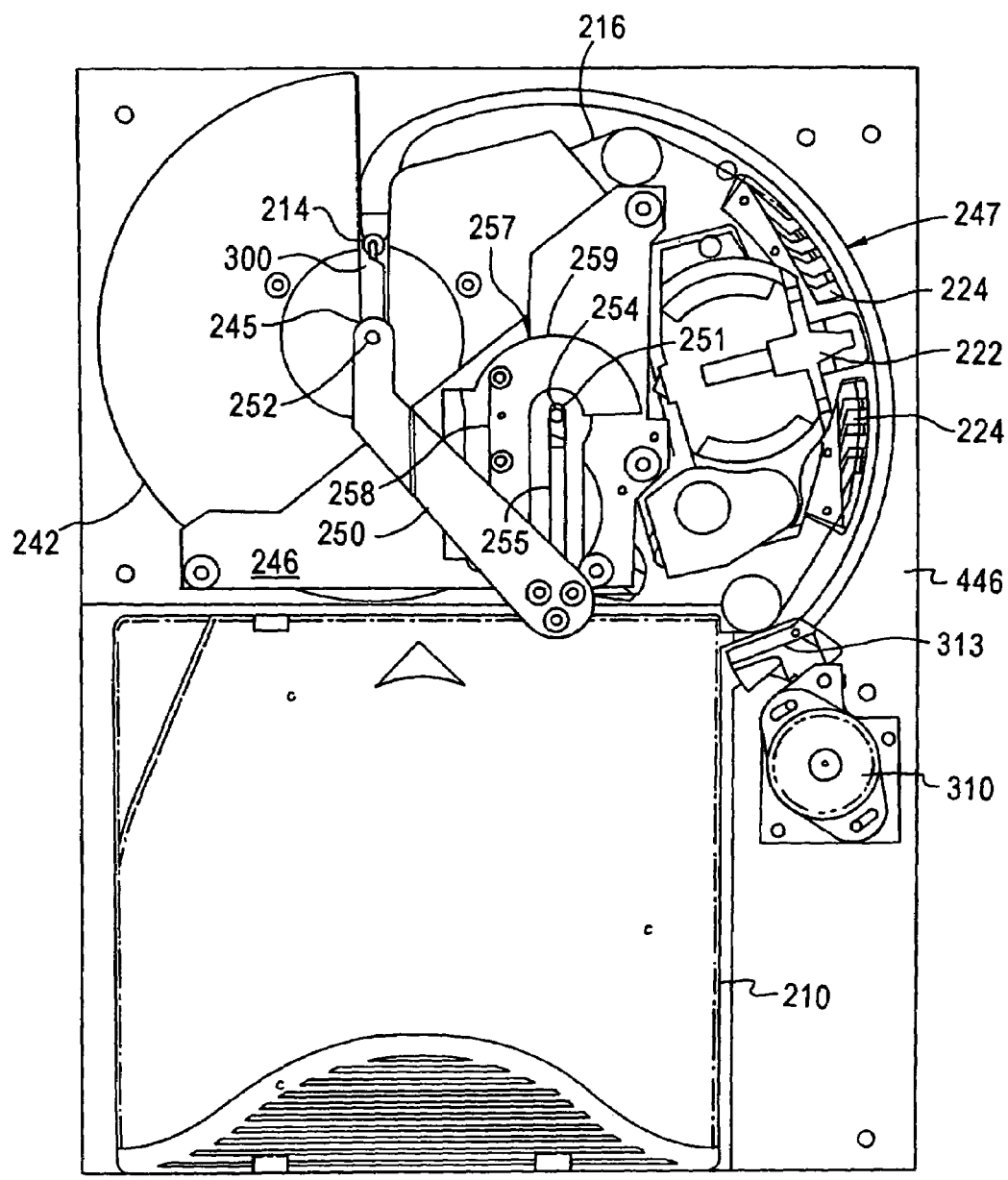
FIG. 2 is a top view of the prior art tape drive loading mechanism.
Figure 3:
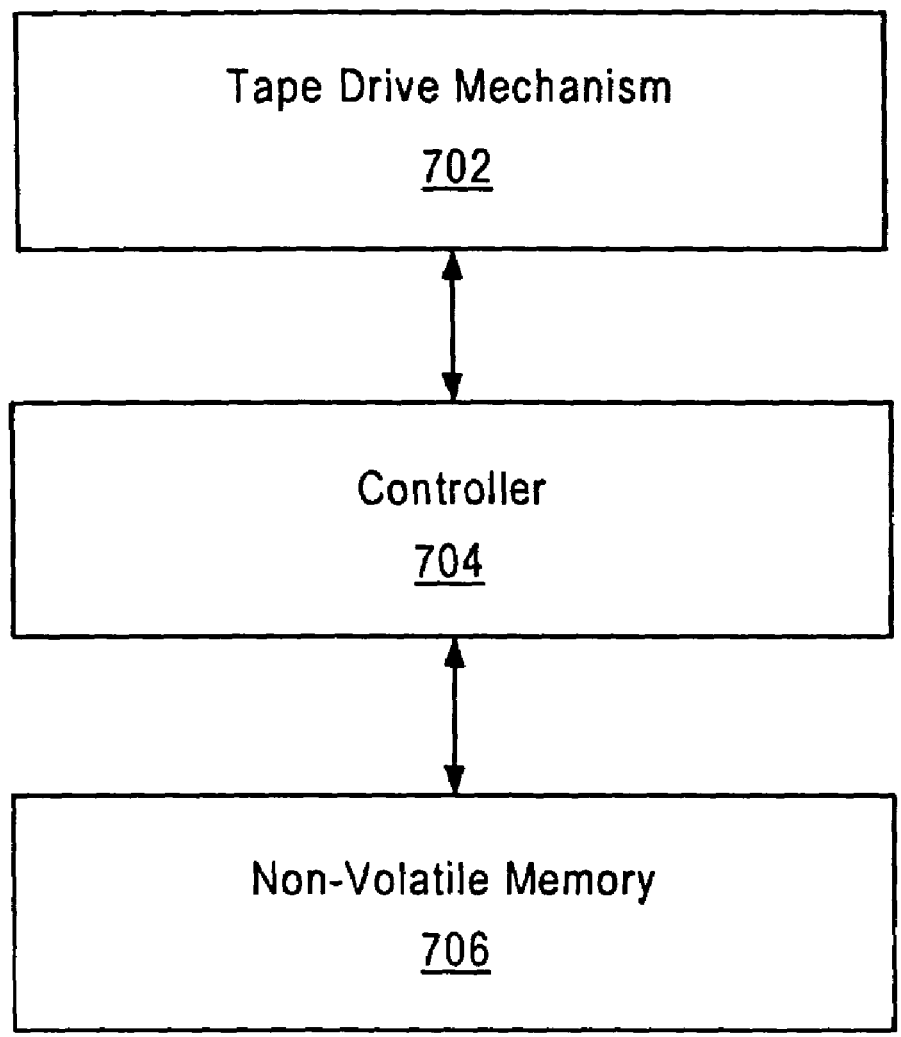
FIG. 3 is a block diagram depicting an exemplary relationship between a tape drive mechanism, a controller, and a non-volatile memory.

FIG. 3 is a block diagram depicting an exemplary relationship between a tape drive mechanism, a controller, and a non-volatile memory. Controller 704 controls the mechanical operation of tape drive mechanism 702. In order for the tape drive mechanism 702 to perform the operations necessary for the operation of the tape drive mechanism 702, instructions from the controller 704 must be received. For instance, the tape drive mechanism 702 may be attaching to the end of a tape in a tape cartridge. For such an operation, the controller 704 sends instructions to the tape drive mechanism 702. As an example, these instructions specifically instruct the mechanical components of the tape drive mechanism 702 to insert a hub filler of the tape drive mechanism 702 into a tape cartridge and attach the hub filler to a leader pin. After the attachment, the tape drive mechanism 702 receives further instructions which specifically control the movement of the hub filler with the attached leader pin to a take-up reel. These instructions may include the direction of movement of a component, the speed of such a movement, and the timing of such a movement. One of ordinary skill in the art will appreciate other instructions necessary to control the operation of a tape drive mechanism 702, which controller 704 can provide.

Instructions provided by controller 704 to the tape drive mechanism 702 are often complex and involved. Accordingly, these instructions may be in the form of a sequence of instructions. A non-volatile memory 706 is coupled to the controller 704. In embodiments of the present invention, the controller 704 stores an instruction and/or the functional state in the non-volatile memory 706, after the controller 704 has issued an instruction to the tape drive mechanism 702. The instruction sent to the tape drive mechanism 702 from the controller 704 directly relates to the functional state of the tape drive mechanism 702. Accordingly, when the controller 704 stores an instruction in relation to the sequence of instructions sent to the tape drive mechanism, the controller 704 is effectively storing the functional state of the tape drive mechanism 702 in the non-volatile memory 706.

Non-volatile memory 706 is an example of non-volatile data storage. There are multiple embodiments that can comprise such non-volatile data storage. In some embodiments the non-volatile data storage is an electrically erasable programmable read only memory (EEPROM). An EEPROM is a reprogrammable read-only memory in which memory cells may be erased electrically and in which each memory cell may be reprogrammed electrically. An EEPROM can only be erased and reprogrammed by electronic methods. In other embodiments, the non-volatile data storage may be a bubble memory. A bubble memory is a type of non-volatile storage that uses magnetic fields to create regions of magnetization. In a bubble memory, a pulsed field breaks the regions of magnetization into isolated bubbles; the pulse field is free to move along the surface and the presence or absence of a bubble represents digital information. Bubble memory is often times referred to as magnetic bubble memory. In yet other embodiments, the non-volatile data storage comprises a random access memory (RAM) with a battery back-up. RAM is memory that permits access to any of its address locations in any desired sequence with similar access time to each location. Typically, RAM is a volatile memory device. However, if a battery backs up RAM, such an arrangement is a non-volatile memory. One of ordinary skill in the art would recognize other equivalents to non-volatile data storage; these equivalents have the ability to store information and for that information to be read out of the memory after a loss of external power to the memory.

One of ordinary skill in the art would also realize that FIG. 3 is merely exemplary and that the tape drive mechanism 702, controller 704, and non-volatile memory 706 may or may not be co-located or integrated. The location of these components of FIG. 5 is not material to the use of the present invention.

Figure 4:
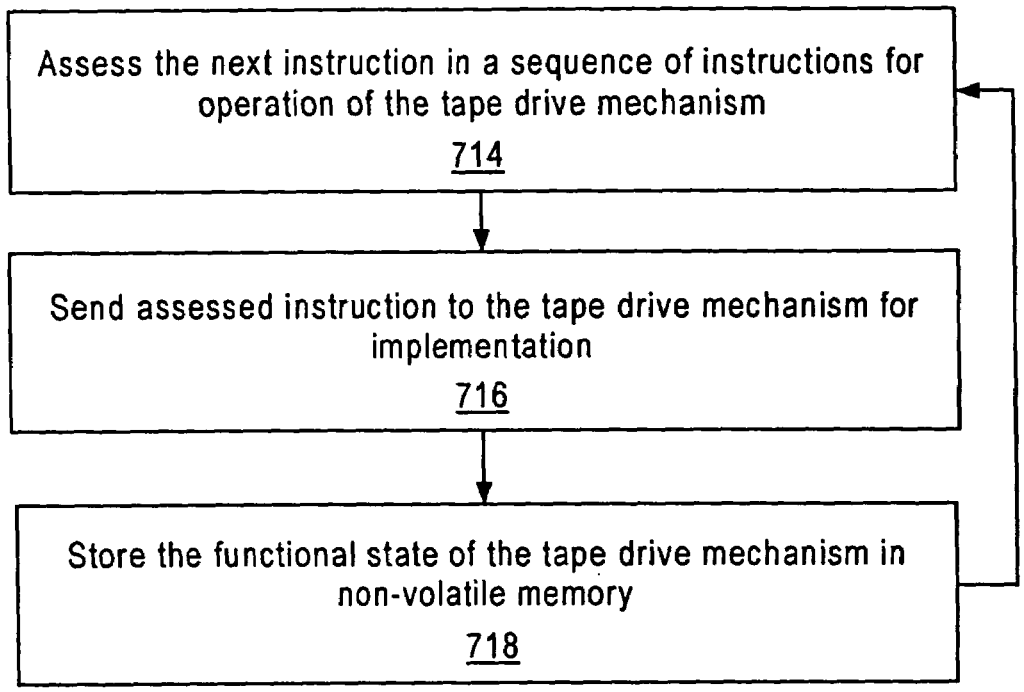
FIG. 4 is a flow chart of the basic cycle of operations of a controller in relation to a tape drive mechanism and a non-volatile memory.

FIG. 4 is a flow chart of the basic cycle of operations of a controller in relation to a tape drive mechanism and a non-volatile memory during normal operation. Block 714 is an operation that assesses the next instruction in a sequence of instructions for tape drive mechanism 702. This assessment may be the reading of the functional state of the tape drive mechanism 702 stored in the non-volatile memory 706 in relation to the sequence of instructions that the tape drive mechanism 702 is performing. This assessment may also include signals from sensors in the tape drive mechanism 702 that indicate the occurrence of some mechanical event within the tape drive mechanism 702. For example, a signal from a sensor located at a take-up reel may indicate that a hub filler is accurately positioned within the take-up reel. In some embodiments of the present invention, the assessment of block 714 includes consideration of the functional state sent from the non-volatile memory 706 and signals received from a sensor. After the next instruction in a series of instructions is assessed in block 714, this instruction is sent to the tape drive mechanism 702 for implementation, as shown in block 716. The tape drive mechanism 702 will receive an instruction and perform the corresponding operation. An instruction may include component information, directional information, speed information, or timing information that enables the tape drive mechanism to perform the operation. After the assessed instruction is sent to the tape drive mechanism in block 716, the controller stores the functional state of the tape drive in the non-volatile memory, as shown in block 706. The functional state that is stored may include a representation of the assessed instruction in relation to the sequence of instructions being performed by the tape drive mechanism 702. The functional state stored comprises enough information, such that during reinitialization after a power loss, the tape drive mechanism can resume operation without mechanical failure and with minimal time delay. Upon completion of storage of the functional state in the non-volatile memory in block 718, the controller returns to block 714 to assess the next instruction.

Figure 5:
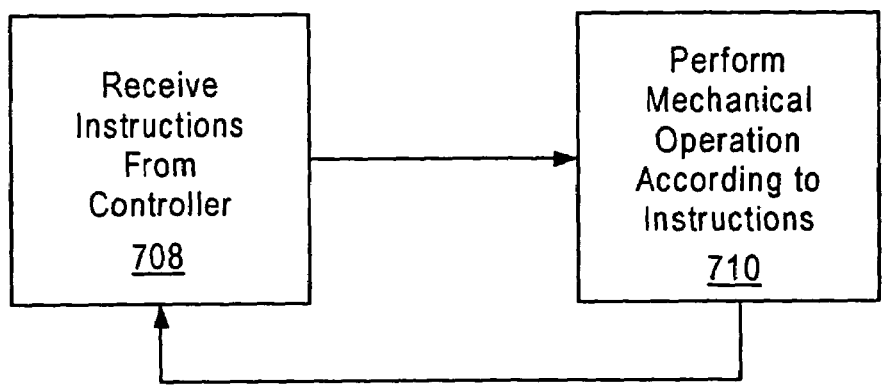
FIG. 5 is a flow chart of the exemplary relationship between a tape drive mechanism in relation to a controller.

FIG. 5 is a flow chart of the exemplary functional relationship between a tape drive mechanism in relation to a controller. In block 708, tape drive mechanism 702 receives an instruction from controller 704. The tape drive mechanism 702 then proceeds to block 710 to perform the mechanical operation in accordance with the received instruction. After performing the mechanical operation, the tape drive mechanism 702 returns to block 708 to receive the next instruction from the controller 704. The tape drive mechanism 702 does not proceed from block 708 to block 710, until an instruction is received from the controller 704. The instructions received from the controller 704 are adequate for the tape drive mechanism 702 to perform the desired operation.

Figure 6:
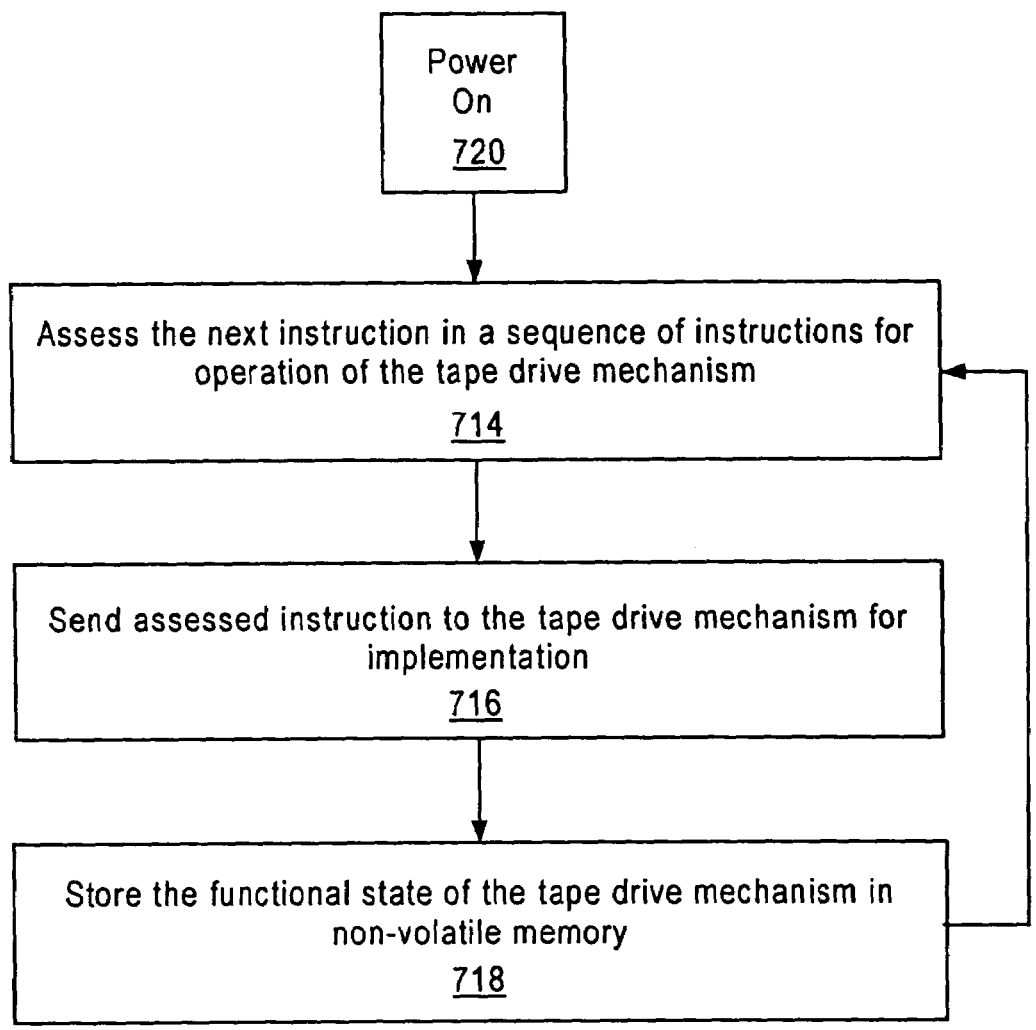
FIG. 6 is a flow chart of the operation of the present invention upon reinitialization of the tape drive mechanism after power loss.

FIG. 6 is a flow chart of the operation of the present invention upon reinitialization of the tape drive mechanism after power loss. In block 720, the power to the tape drive is turned on. This power relates to the controller 704, the non-volatile memory 706, and the tape drive mechanism 702. After power on, the tape drive proceeds directly to block 714 of the flow chart. In FIG. 8, blocks 714, 716, and 718 are identical to blocks 714, 716, and 718 shown in FIG. 6. In block 714, the next instruction is assessed in the sequence of instructions for the tape drive mechanism 702. In block 716, the assessed instruction is sent to the tape drive mechanism 702 for implementation. In block 718, the functional state of the tape drive mechanism 702 is stored in the non-volatile memory 706. After block 718 is implemented, control is returned to block 714 to assess the next instruction. This process continues indefinitely until the next power off.

The present invention provides an improved method and apparatus utilizing non-volatile memory to store the functional state of a tape drive mechanism. The present invention improves the ability for a tape drive to reinitialize after a power loss. Specifically, the tape drive mechanism of the present invention can quickly reinitialize after regaining power following a power loss. The likelihood of a mechanical failure during this reinitialization of the present invention is significantly reduced, compared to the reinitialization of a conventional tape drive.

Although the present invention has been described and illustrated in detail, it is to be clearly understood that the same is by way of illustration and example only, and is not to be taken by way of limitation, the scope of the present invention being limited only by the terms of the appended claims.

What is claimed is:

1. A tape drive comprising:
    a take-up reel;
    a non-volatile memory;
    a tape drive mechanism configured to load and unload tape between the take-up reel and a single reel tape cartridge in accordance with instructions stored in the non-volatile memory; and
    a controller configured to store the functional state of the tape drive mechanism in the non-volatile memory and to control and reinitialize the tape drive mechanism in accordance with the functional state stored in the non-volatile memory,
    wherein the functional state read from the non-volatile memory facilitates resumption of operation of the tape drive mechanism during transport of one end of the tape to and from a take-up reel following reinitialization.

2. The tape drive of claim 1, wherein the controller is configured to store in the non-volatile memory the last instruction issued to the tape drive mechanism in relation to a sequence of instructions issued to the tape drive mechanism, as the functional state of the tape drive mechanism.

3. The tape drive of claim 1, wherein the controller is configured to read the functional state from the non-volatile memory during reinitialization of the tape drive.

4. The tape drive of claim 1, wherein the controller is configured to utilize the functional state in the non-volatile memory to continue the sequence of instructions that the tape drive mechanism was performing at the time of storage of the functional state in the non-volatile memory.

5. The tape drive of claim 4, wherein the functional state read from the non-volatile memory prevents the repeating of an instruction that the tape drive mechanism has already performed in the sequence of instructions that the tape drive mechanism was performing at the time of storage of the functional state.

6. The tape of claim 1, wherein the non-volatile memory is an electrically erasable programmable read-only memory.

7. The tape drive of claim 1, wherein the non-volatile memory is a bubble memory.

8. The tape drive of claim 1, wherein the non-volatile memory is battery backed-up random access memory.

* * * * *